Sept. 27, 1949.  W. DUFFY  2,483,380
TOOL FOR HANDLING OPEN-ENDED SPRING RETAINING RINGS
Filed March 26, 1946  2 Sheets-Sheet 1
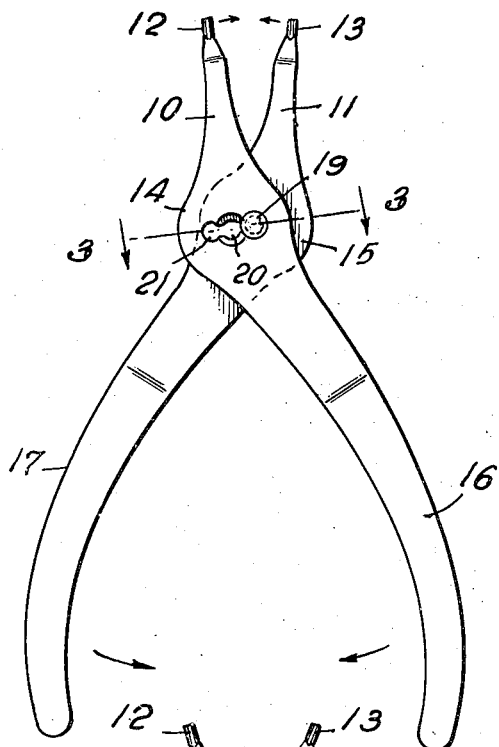
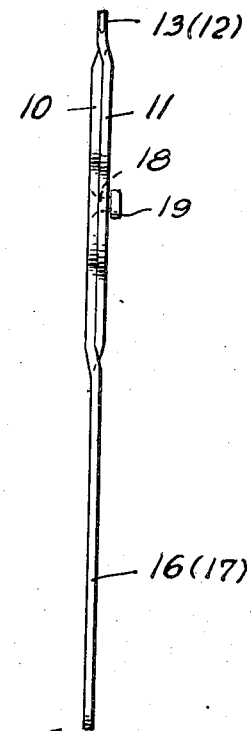
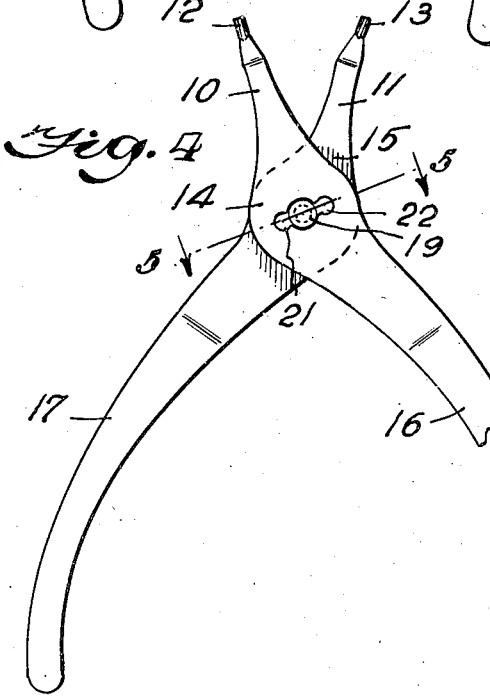
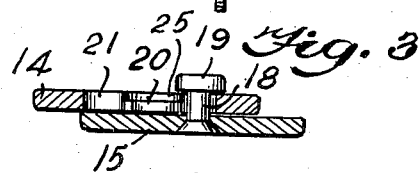
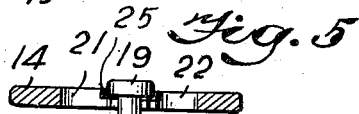
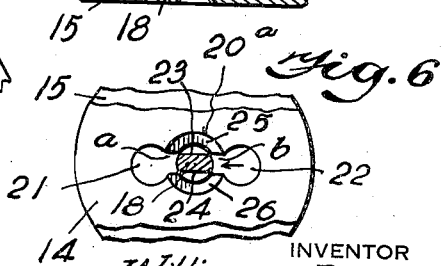
INVENTOR
William Duffy,
BY
ATTORNEY Sept. 27, 1949.  W. DUFFY  2,483,380
TOOL FOR HANDLING OPEN-ENDED SPRING RETAINING RINGS
Filed March 26, 1946  2 Sheets-Sheet 2
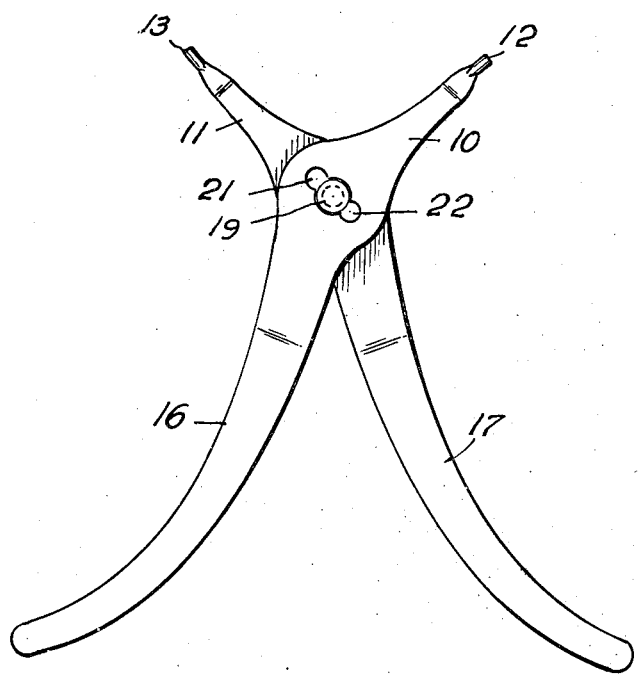
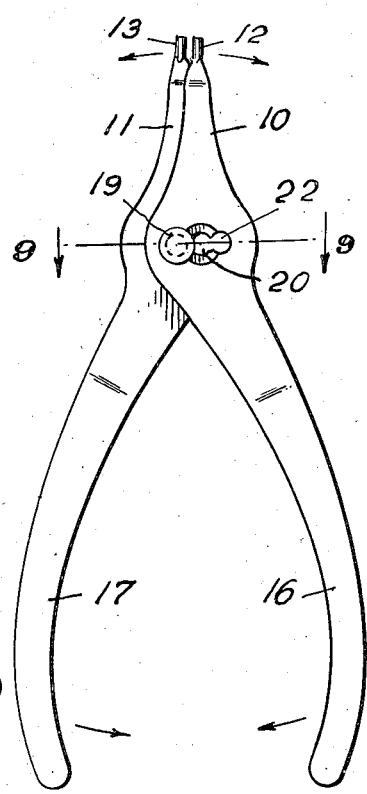
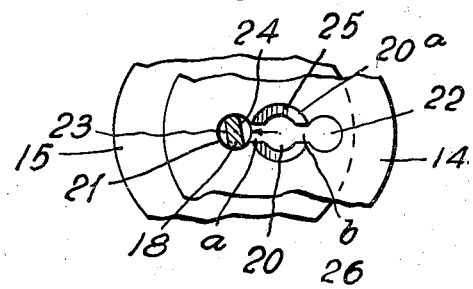
INVENTOR
William Duffy,
BY
ATTORNEY Patented Sept. 27, 1949

2,483,380

UNITED STATES PATENT OFFICE 2,483,380

TOOL FOR HANDLING OPEN-ENDED SPRING RETAINING RINGS

William Duffy, Maspeth, N. Y., assignor to Waldes Koh-I-Noor, Inc., Long Island City, N. Y., a corporation of New York Application March 26, 1946, Serial No. 657,211

4 Claims. (Cl. 29—229)

This invention relates to improvements in tools for handling open-ended spring retaining rings of the type adapted to provide an artificial shoulder on a shaft or in a housing bore for securing a machine part against axial displacement, and more particularly to a plier-type tool which is capable of handling both the so-called external and internal forms of such retaining rings.

The assembly of such rings in their shaft or housing bore grooves requires, in the case of the external ring, that it be spread over a free end of the shaft and shifted therealong to the plane of its seating groove and, in the case of the internal ring, that it be contracted to an outer diameter smaller than that of the housing bore and thereupon slipped into the latter to groove depth, with the same operations being required in disassembly.

Heretofore, two different types of pliers were required in the handling of such rings, one for the internal and the other for the external rings. Thus, the mechanic who is called upon to assemble or replace retaining rings in the field must not only carry several sizes of pliers for the handling of different sizes of rings, but must also maintain two complete sets of such pliers, by virtue of the fact that assembly or replacement of both external and internal rings may be called for.

The invention has for its principal object the provision of a simple tool which is capable of handling both internal and external rings in equally effective manner. More particularly, the invention contemplates and provides a tool which, by a simple operation, is convertible to use with either internal or external rings whereby, for the same ring sizes, one tool may be employed in the assembly and/or disassembly of both forms of ring.

It is a further object of the invention to provide a convertible tool as aforesaid, which is of simple, rugged and inexpensive construction, which is characterized by thoroughly dependable operation, and which is so designed that the conversion as aforesaid may be effected in exceedingly simple manner.

The above and other objects will be in part obvious and in part pointed out in connection with the following analysis of the invention, wherein a physical embodiment of a convertible tool forming the subject-matter thereof is illustrated.

In the drawings—

Fig. 1 is a plan view of a plier-type tool according to the invention organized to handle internal retaining rings;

Fig. 2 is a side view thereof;

Fig. 3 is a section taken along line 3—3 of Fig. 1;

Figs. 4 and 7 are plan views illustrating successive positions assumed by the tool parts in converting the tool to handle external rings;

Fig. 5 is a section taken along line 5—5 of Fig. 4;

Fig. 6 is a broken-away plan view of the hubs and pivot pin in the position of the tool parts shown in Fig. 4, the pivot pin being cut through in a plane beneath its head to illustrate pin and slot constructional details;

Fig. 8 is a view similar to Fig. 1, illustrating the relation of the tool parts upon full conversion of the tool to the handling of external rings having been effected; and Fig. 9 is a view similar to Fig. 6, illustrating pin and slot relationship when the tool parts are positioned as in Fig. 8.

In the drawings, reference characters 10 and 11 designate two tool tips terminating at their free ends in working points 12, 13, and being integrally connected through hubs 14, 15 with operating handles 16, 17, respectively. The tool parts 10, 12, 14, 16 and 11, 13, 15, 17 are pivotally connected at their hub portions by means of a pin 18 which is rigidly affixed to hub 15 of one tool part, and operates in a transverse pin slot formed in the hub 14 of the other tool part. Pin 18 is provided with a large diameter head 19 which is spaced from the face of hub 15 the approximate thickness of hub 14, thereby to normally maintain the tool parts against separation while permitting relative swinging movement thereof.

As seen in Fig. 2, the working points 12 and 13 are offset out of the plane of their tool tips and towards each other an amount such that they lie in the same working plane. Hence, the headed pin 18, by normally securing the tool parts against separation, also functions to maintain the working points in their operating plane aforesaid.

The pin-slot of hub 14 is specially formed to provide a part-circular counter-bored middle aperture 20 and two end apertures 21 and 22, the latter being shaped as circle segments of more than 180° and opening into the middle aperture 20 through passages a and b (Fig. 6) which are formed with straight side walls. The diameter of all three apertures corresponds to that of the pin 18, with the segmental end apertures 21, 22 being adapted to receive and confine the pin in the two working positions of the tool parts, as will be described.

Pin 18 is formed with opposite flat faces 23, 24, the thickness of the pin between said faces corresponding to the width of the straightway passages a and b. Hence, it will be seen that the pin can be shifted from one to the other of the apertures 20, 21, 22 only when the tool parts have been moved to relative positions in which the flat faces 23, 24 of the pin register or line up with the straight sides of the passages a and b, namely, in the two (approximate) positions of the tool parts shown in Figs. 4 and 7. In all other relative positions of the tool parts, and particularly in their two working positions, pin 18 operates and is confined within one of the end apertures 21 or 22, and therefore the tool hubs are maintained in a closely overlying relationship corresponding to that shown in Fig. 3, in which the offset working points 12, 13 are disposed in a common plane.

According to the invention, shifting of pivot pin 18 from aperture 21 to aperture 22 (or vice versa) requires that the two tool parts be separated axially by an amount such that the offset working point of each tool part will clear the handle of the other part, as the parts are swung or rotated relative to each other about the axis of pin 18 to positions in which the tool handles are longitudinally aligned. The counter-bore 20a of the middle aperture 20 of the pin-slot provides for the separation aforesaid, being of diameter and depth as to receive the pin head 19 and to permit axial separation of the hubs and hence of the working points 12, 13 by an amount providing the necessary point-to-handle clearance. The counter-boring of the middle aperture 20 moreover results in the formation of spaced arcuate flanges 25, 26, against which the under face of the head 19 is adapted to seat whereby the head prevents complete separation of the tool parts during the relative swinging movement aforesaid.

Thus, assuming the handles to be swung to the approximate position shown in Fig. 4, in which the pin 18 can be shifted from end aperture 22 to the middle aperture 20 of the pin-slot as aforesaid, the pin head 19 is shown to be seated in the countersunk middle opening 20, and a slight axial separation of the tool parts is accordingly permitted. This will be clear from an analysis of Fig. 5 in which the separation of the tool parts has been illustrated, and a comparison of this figure with Fig. 3 wherein the pin is shown seated in end aperture 22.

In such separated position of the parts, the handle 16 may be swung counterclockwise about pivot pin 18 to the other side of handle 17, as in Fig. 7, the axial separation of the tool parts permitting the offset working points to clear the handles as the points and handles cross each other.

With the tips and handles coupled and arranged as in Fig. 1, it will be observed that pin 18 operates in end aperture 22 of the slot, and accordingly pin head 19 secures the tool parts in the closely overlying relation in which the working points 12, 13 operate in a common plane. It will be seen also that in the Fig. 1 position of the tool parts the tip 10 and its working point 12 is to the left of tool tip 11 and its working point 13, and hence to the left of longitudinal center line of the tool. As the operating handles 16, 17 cross one another in the region of their hub portions the tool is adapted to function in the manner of a crossed-handle pliers, with compression of the handles resulting in closing of the working points, i. e. their movement towards one another. Hence, upon the working points 12, 13 being inserted into the ear apertures of an internal ring, compression of the handles will effect contraction of the ring, whereby it may be slipped into a housing bore and assembled in its seating groove.

To convert the tool shown in Fig. 1 to the handling of external rings, the handles are moved in separating direction to their approximate Fig. 4 position, in which the flat faces 23, 24 of the pin line up with the straight sides of passage b between end aperture 22 and middle aperture 20 of the pin slot. The tool parts are then shifted relatively of each other, with the result that pin 18 shifts in the direction of the arrow (Fig. 6) into the central aperture 20, whereupon the pin head 19 seats in the counter-bore 20a. The tool parts are now given their axial separating movement, and tool part comprising tip 10 and its handle 16 is swung counterclockwise around the pivot axis to the other side of the handle 17 and to the approximate position illustrated in Fig. 7, the offset working points 12 and 13 being permitted to clear the handles 17, 16, respectively, through the axial separation permitted the tool parts as aforesaid.

Upon the tool parts assuming their approximate Fig. 7 position, the straight side faces 23, 24 of the pin 18 now line up with the straight side edges of the passage a between middle aperture 20 and end aperture 21, the handles are shifted relatively to each other to shift the pin in the direction of the arrow (Fig. 9) into the latter aperture. With the handles 16, 17 positioned as in Fig. 7, and with the pin shifted into aperture 21, the former are now forced past each other in the direction of the arrows until ultimately the tool parts assume their relative position as illustrated in Fig. 8. In such position, it will be seen that, while the handle position remains the same, the relative positioning of the tips and working points has been reversed as respects their Fig. 1 position, the tip 11 and working point 13 of handle 17 being now to the left of tip 10 and working point 12 of handle 16. Hence, the tool is now capable of operating as a simple pivoted-lever type of pliers, with compression of the handles resulting in separating movement of the working points 12, 13. Accordingly, insertion of the working points 12, 13 into the ear apertures of an external ring requiring spreading in its assembly and compression of the handles results in separation of the working points and a consequent spreading of the ring as required to shift it over the free end of a shaft, for example.

It will be understood that to reconvert the tool when set up as in Fig. 8 to the handling of internal rings the reverse operations are followed, resulting in the tool parts returning to their Fig. 1 position.

A tool constructed as in the foregoing has the additional advantage that its working points may be shaped to counter the tendency of the rings being handled to slip off the points. For example, the working points 12 and 13 are shown in Fig. 1 as being slightly in-bent in their operating plane. Thus, when working on internal rings requiring contraction the points have a slight hooking action as they engage with the apertured ears, which is sufficient to counteract the tendency of the ears slipping from the points as the ring is contracted. Upon reversal of the relative position of the tool tips and their working points to handle external rings, as in Fig. 8, the working points 12, 13 turn slightly outwardly, so as to have a slight hooking effect when engaged with the apertured ears of an external ring, which thus provides additional securement between working points and ring as the latter is spread. Hence, in either position of the working points, they automatically arrange themselves to assist in preventing the rings from falling as they are deformed in assembly or disassembly.

As many changes could be made in carrying out the above construction without departing from the scope of the invention, it is intended that all matter contained in the above description or shown in the accompanying drawings shall be interpreted as illustrative and not in a limiting sense.

I claim:

1. A plier type tool for handling both external and internal retaining rings requiring deformation in their assembly and disassembly and which are provided at their open ends with apertured ears, comprising a pair of tool parts terminating at their free ends in working points which are offset towards one another to lie in a common plane and being adapted for insertion into the ear apertures, said tool parts each having a hub portion and an operating handle, a headed pivot pin carried by one of said hubs operating in a pin slot provided in the other hub, said slot being shaped to define part-circular end and middle apertures and narrow-width passages connecting said apertures having straight side edges, the middle aperture being counter-bored and the counter-bore thereof being adapted to receive said head and thereby permit limited axial separation of the tips and their working points, said pin being provided with straight side faces and having thickness between said faces which is less than the width of said passages whereby the pin is shiftable along said slot from one to the other end apertures in two predetermined angular positions of the tool parts, the construction and arrangement being such that relative reversal to the tool parts and their working points with respect to the center line of the tool can be effected by swinging the handles from an initial working position first to one of said predetermined positions, then shifting the pivot pin from one end aperture to the middle aperture, then effecting axial separation of the tool parts, then swinging the handles to the other predetermined position, then shifting the pin from the middle to the other end aperture, and, finally moving the handles past one another until they assume substantially their initial position.

2. A plier-type tool for handling both external and internal retaining rings requiring deformation in their assembly and disassembly and which are provided at their open ends with apertured ears, comprising a pair of tool parts terminating at their free ends in working points for insertion into the ear apertures and which are offset towards each other to lie in a common working plane, said tool parts each having a hub portion and an operating handle, and a pin and slot connection between the hub portions providing both for normal pivotal movement of the plier handles and for bodily transposition of the working points to opposite sides of one another, said connection including a pin fixed to the hub portion of one tool part and being shiftable along the length of a transversely extending slot provided in the hub portion of the other tool part to operative positions at either end of said slot in which the pin secures the tool parts for normal pivotal movement, said pin and slot including means for permitting limited axial separation of said tool parts by an amount permitting the working points to clear one another when being transposed.

3. A plier-type tool for handling both external and internal retaining rings requiring deformation in their assembly and disassembly and which are provided at their open ends with apertured ears, comprising a pair of tool parts terminating at their free ends in working points for insertion into the ear apertures and which are offset towards each other to lie in a common working plane, said tool parts each having a hub portion and an operating handle, and a pin and slot connection between the hub portions providing both for normal pivotal movement of the plier handles and for bodily transposition of the working points to opposite sides of one another, said connection including a pin affixed to the hub portion of one tool part and having a head spaced from the face of said one hub portion the approximate thickness of the other hub portion, said other hub portion having a transversely extending slot shaped to define part-circular end and middle openings having a diameter corresponding to the pin diameter and being connected by straight-way passages having a width less than the diameter of said openings, said pin having one dimension slightly less than the width of the passages whereby the pin may be shifted from one end opening to the other, the middle opening having a counterbore for receiving the head of the pin, thereby to permit limited axial separation of the tool parts and hence of their working points by an amount permitting said points to clear one another when being transposed.

4. A plier-type tool for handling both external and internal retaining rings requiring deformation in their assembly and disassembly and which are provided at their open ends with apertured ears, comprising a pair of tool parts terminating at their free ends in working points for insertion into the ear apertures and which are offset towards each other to lie in a common working plane, said tool parts each having a hub portion and an operating handle, and a pin and slot connection between the hub portions providing both for normal pivotal movement of the plier handles and for bodily transposition of the working points to opposite sides of one another, said connection including a pin affixed to the hub portion of one tool part and having a head spaced from the face of said one hub portion the approximate thickness of the other hub portion, said other hub portion having a transversely extending slot shaped to define part-circular end and middle openings having a diameter corresponding to the pin diameter and being connected by straight-way passages having a width less than the diameter of said openings, said pin having flat side faces and a thickness between said faces which is slightly less than the width of said passages, whereby when the flat side faces are lined up with the edges of said passages the pin may be shifted from one end opening to the other, the middle opening having a counterbore for receiving the head of the pin, thereby to permit limited axial separation of the tool parts and hence of their working points by an amount permitting said points to clear one another when being transposed.

WILLIAM DUFFY.

REFERENCES CITED

The following references are of record in the file of this patent:

UNITED STATES PATENTS

| Number | Name | Date |
|---|---|---|
| 1,051,921 | Schlehr | Feb. 4, 1913 |
| 1,122,165 | Schoening | Dec. 22, 1914 |
| 1,927,618 | Spangler | Sept. 19, 1933 |